US006547172B2

(12) United States Patent
Reinders et al.

(10) Patent No.: US 6,547,172 B2
(45) Date of Patent: Apr. 15, 2003

(54) CHEWING APPARATUS

(75) Inventors: Gerald Reinders, Salzkotten (DE); Harry Erfurt, Uslar (DE); Horst Boos, Holzminden (DE); Rainer Wellmann, Holzminden (DE)

(73) Assignee: Haarmann & Reimer GmbH (DE)

( * ) Notice: Subject to any disclaimer, the term of this patent is extended or adjusted under 35 U.S.C. 154(b) by 73 days.

(21) Appl. No.: 09/838,431

(22) Filed: Apr. 19, 2001

(65) Prior Publication Data

US 2001/0045475 A1 Nov. 29, 2001

(30) Foreign Application Priority Data

Apr. 27, 2000 (DE) .......................... 100 20 617

(51) Int. Cl.$^7$ ............................................. B02C 19/00
(52) U.S. Cl. .......................... 241/57; 241/65; 241/236
(58) Field of Search .............................. 241/65, 57, 236

(56) References Cited

PUBLICATIONS

Z. Lehensm. Unters Forsch. (month unavailable), 1995, pp. 62–68, Konrad Naβl et al, "A method to mimic and to study the release of flavour compounds from chewed food".

J. Agri Food Chem. (month unavailable), 1995, 43, pp. 2179–2186, Deborah D. Roberts et al, "Simulation of Retronasal Aroma Using a Modified Headspace Technique: Investigating the Effects of Saliva, Temperature, Shearing, and Oil on Flavor Release".

Trends in Flavour Research (month unavailable), 1994, pp. 59–64, S. M. van Ruth, et al, "Comparison of dynamic headspace mouth model systems for flavour release from rehydrated bell pepper cuttings".

J. Agric Food Chem. (month unavailable), 1996, 44, pp. 3560–3563, J. S. Elmore et al, "Novel Vessel for the Measurement of Dynamic Flavor Release in Real Time from Liquid Foods".

J. Food Sci (month unavailable), 1986, vol. 51, No. 1, pp. 249–250, William E. Lee III, "A Suggested Instrumental Technique for Studying Dynamic Flavor Release from Food Products".

Food Flavours: Formation, Analysis & Packaging Influences, (month unavailable), 1998, pp. 111–116, S. J. Withers et al, A simulated mouth to study flavor release from alcoholic beverages.

*Primary Examiner*—Mark Rosenbaum
(74) *Attorney, Agent, or Firm*—Pendorf & Cutliff

(57) ABSTRACT

A novel apparatus can be used to simulate the chewing process, wherein the wherein the apparatus comprises a thermostattable kneading space comprising an upper portion and lower portion, wherein the lower portion comprises at least two kneading paddles for comminuting and kneading the test material and the upper portion comprising an air space for connecting the volatile components released during the comminution and kneading, wherein said apparatus comprises an inlet in which saliva is introduced into the kneading space and a second inlet in which air is passed into the kneading space, wherein air is passed together with the volatile components of the comminution and kneading process through an outlet of the kneading space to a detector system.

3 Claims, 1 Drawing Sheet

CHEWING APPARATUS

FIELD OF THE INVENTION

The invention relates to an apparatus for simulating the chewing process and its use for identifying volatile components, which are released into the oral area during the chewing process.

BACKGROUND OF THE INVENTION

J. Food Sci. (1986) 51 (1); 249–250, Trends in Flavour Research (1994), 59–64; Z. Lebensm. Unters. Forsch. (1995) 201; 62–68; J. Agric. Food Chem. (1995) 43, 2179–2186; J. Agric. Food Chem. (1996) 44, 3560–3563 and Food Flavors: Formation, Analysis and Packaging Influences (1998); 111–116 disclose apparatuses for simulating the chewing process. Using these apparatuses, the aroma composition of the samples taken dynamically from the headspace above a mixed food can be analyzed by detector systems directly or after gas-chromatographic separation. However, only liquid and low-viscosity samples may be mixed or comminuted by the apparatuses. It is also a disadvantage that the apparatuses cannot be automated.

SUMMARY OF THE INVENTION

The object of the present invention is to provide an apparatus in which the chewing and kneading process in the human mouth is simulated, so that comparable (standardized) studies are possible on different materials.

An apparatus for simulating the chewing process has been found which is characterized in that it comprises a thermostattable kneading space having a lower and upper part. In the lower part, kneading paddles are situated for comminuting and kneading the test material. In the upper part, an air space is situated for connecting the volatile components produced during the comminution and kneading. Saliva is introduced into the kneading space through an inlet and air is passed into the kneading space through a further inlet, wherein air is passed together with the volatile components of the comminution and kneading process through an outlet of the kneading space to a detector system.

DETAILED DESCRIPTION OF THE INVENTION

Figure 1:
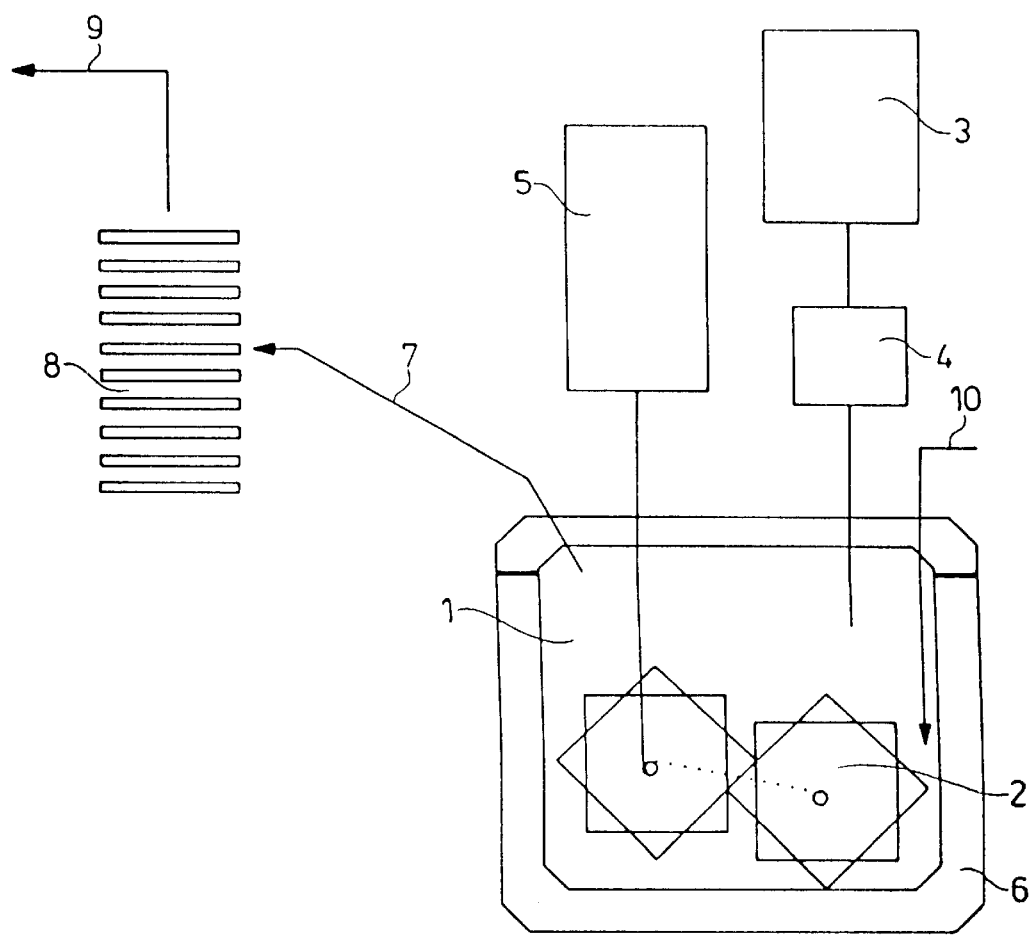
FIG. 1 shows a diagram of the apparatus of the present invention.

Surprisingly, materials of all types can be placed into the inventive apparatus as test materials. The test process may be substantially automated in the inventive apparatus, so that comparable tests of various materials are possible.

The kneading space is generally formed as a vessel, which can be sealed by a lid. The kneading region in the lower part corresponds, at 50 to 100 cm$^3$, roughly to the human oral cavity. The upper part (head space) comprises 150 to 200 ml. The vessel and the cover may be thermostatted. Generally, the kneading space is set at a physiological temperature (35 to 37° C.).

The thermostatting can be performed by customary methods. Preferably, the kneading space including the cover is provided with a double wall through which a liquid (for example water) is passed for heat transfer.

The lower part of the kneading space is filled with kneading paddles, so that there is virtually no dead space (volume which is not covered by motion of the kneading paddles). The kneading paddles are driven by a motor having a torque of 1 to 10 Nm, preferably 5 to 6 Nm. The speed of rotation of the motor is variable from 0.1 to 240 min$^{-1}$. Preference is given to a speed of rotation in the range 30 to 150 min$^{-1}$, which corresponds to the human chewing frequency and permits simulation of eating habits by exact setting.

The kneading paddles are generally unregularly shaped, have many areas, rotate countercurrently and mesh on rotation. Additionally, the kneading dead space is reduced by means of plastic attachments to some of the kneading surfaces. Through a gear connection, one kneading paddle rotates about 1.5 times more rapidly than the other, as a result of which shear forces of 0 to 10 Nm occur which compress and pulp the material in the kneading space. A preferred embodiment is a two paddle system.

Through the use of the kneading paddles, materials of all types (solid, liquid or pasty) can be comminuted and kneaded.

Through an inlet, which is preferably mounted on the lid, saliva solution is added to the kneading space. Obviously, in this case, saliva of the most varied composition can be used, that is natural or artificial saliva.

To standardize a simulation of the chewing process, preferably an artificial saliva is used. Artificial saliva has, for example, the composition:

| | |
|---|---|
| 2 to 10 g | of potassium dihydrogen carbonate |
| 0.1 to 1.0 g | of potassium chloride |
| 0.1 to 1.0 g | of sodium carbonate |
| 0.1 to 1.0 g | of pig pancreas α-amylase |
| 0.1 to 1.0 g | of bovine submaxillary gland mucin |
| in 1 l | of demineralized water | adjusted to pH 7 to 8.

The saliva is metered into the kneading space. Metering can be, for example, via a pump or a valve. Generally, 0.5 to 20 g/min, preferably 2 to 10 g/min, of saliva are added to 30 g of the material under test.

Above the kneading space in the upper part of the kneader (head space) volatile components collect, which are formed in the chewing process (comminution and kneading).

To study these volatile components, air is passed into an inlet of the kneading space, preferably via the lid, which, together with the volatile components, is removed via an outlet, also preferably via the lid.

The introduction and removal of the air is to simulate a "respiration" of the kneading space.

The air is passed into the kneading space at a flow rate of 1 to 20 l/min, preferably 5 l/min.

The air loaded with the volatile components is fed to a detector system.

The volatile components can be frozen out successively in a time-dependent manner using a refrigerant, or enriched on adsorption tubes using support materials, such as Tenax TA, Tenax GR, Carbotrap 300 or Carbosieve. By automatic thermal desorption, they may then be separated off-line by gas chromatography and analysed using differing detection systems, such as flame ionization detectors, element-specific detectors, olfactometric detectors or mass spectrometers. Alternatively, direct analysis can be carried out by sensor systems or by sensitive mass- spectroscopic methods (for example APCI-MS), as described in EP-A-0 819 937.

The inventive apparatus can be substantially automated by using a flow controller for the compressed air, a programmable valve switch for the pulsed feeding of air (simulation of a breathing rhythm), a pump for the defined feed of saliva solution and the use of a programmable gas sample collector and subsequent automatic thermal desorption of the adsorbed aroma substances into a gas chromatograph.

Using the inventive apparatus, the effect of the chewing process and the matrix on the dynamic release of aroma substances may be studied and the substances in the material under test which are relevant for human organoleptic perception may be determined.

Suitable test materials are all materials, which are customarily taken into the mouth by humans. These are for example Foods, such as beverages, yogurts, desserts, ice creams, soups, sauces, bread spreads, savory snacks, meat, fish, fruits, nuts, ready-to-eat meals (such as pizza, gourmet salads and baby food), confectionery (such as chocolate, caramels, fruit gums) and chewing gum, oral care compositions, such as toothpaste and mouthwash, animal food, such as moist feed and dry feed, and medicaments, such as cough syrup, sweets for sucking and chewable tablets.

The invention also relates to the use of the inventive apparatus for the determination of volatile substances, which are relevant to the organoleptic perception by humans and are formed during the chewing process.

The inventive apparatus can be described as following using the example of FIG. 1:

In the lower part of the kneading space (1) are situated kneading paddles (2) which are driven by a motor (5) via a gear. The kneading space (1) and the lid are thermostatted (6) by a liquid. Saliva (3) is added to the kneading space (1) via a pump (4) through the lid of the kneading space (1). Air is fed to the kneading space (1) through the gas inlet (10), wherein the air is passed through the outlet (7) to an adsorption system (8). Via the adsorption system (8) it is possible to adsorb the volatile constituents released during the chewing process in a time-dependent manner. After thermal desorption of the individual adsorption tubes and gas-chromatographic separation, the volatile compounds are passed to a detector.

| List of designations |
|---|
| 1. Kneading space |
| 2. Kneader |
| 3. Saliva solution |
| 4. Pump |
| 5. Motor |
| 6. Thermostatting liquid |
| 7. Gas outlet |
| 8. Adsorption system |
| 9. Thermal desorption system with gas chromatograph and detectors |
| 10. Gas inlet system |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for simulating the chewing process, wherein the apparatus comprises a thermostattable kneading space comprising an upper portion and lower portion, wherein the lower portion comprises at least two kneading paddles for comminuting and kneading the test material and the upper portion comprising an air space for collecting the volatile components released during the comminution and kneading, wherein said apparatus comprises an inlet in which saliva is introduced into the kneading space and a second inlet in which air is passed into the kneading space, wherein air is passed together with the volatile components of the comminution and kneading process through an outlet of the kneading space to a detector system.

2. An apparatus according to claim 1, wherein the kneading space is thermostatted to a physiological temperature.

3. An apparatus according to claim 1, wherein the kneading paddles are covering most of the volume of the lower portion of kneading space.

* * * * *